June 4, 1940.  R. NAUTH  2,202,959
METHOD OF THE RECOVERY OF VALUES FROM LIGNITE LIQUOR
Filed May 13, 1937
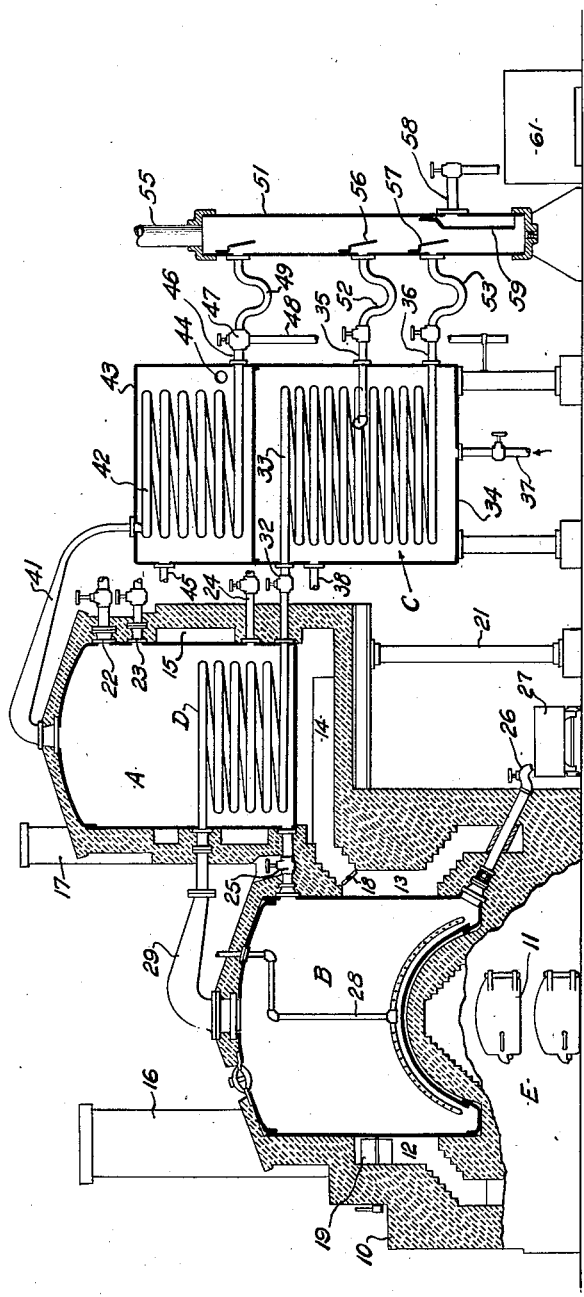
Inventor
Raymond Nauth
Albert R. Henry
Attorney Patented June 4, 1940

2,202,959

UNITED STATES PATENT OFFICE 2,202,959

METHOD OF THE RECOVERY OF VALUES FROM LIGNITE LIQUOR

Raymond Nauth, Buffalo, N. Y.

Application May 13, 1937, Serial No. 142,437

1 Claim. (Cl. 196—76)

This invention relates to a method of recovering valuable constituents from the tarry liquor obtained by the destructive distillation of lignite.

Lignite is a carbonaceous mineral substance, occurring in various localities throughout the United States, containing from about twenty-seven to forty-five per cent carbon, five to twelve per cent ash, appreciable volatile matter or combustible gas, and ten to thirty-five per cent moisture. The material is sometimes called "brown coal," but its composition and properties are such that it cannot be technically classified as a true coal. Heretofore it has been customary to subject such material to a destructive distillation process, to drive off the water and volatile matter, leaving the carbon and ash as a residue, suitable for use as a fuel.

According to the present invention, apparatus and a method are provided which may be advantageously utilized to recover a number of ingredients, all of which are valuable in the industrial arts. Speaking in very broad terms, the invention is based on the plan of subjecting the liquor, in which the values are contained, to a distillation process, which differs from ordinary distillation, however, in a number of important features hereinafter more fully set forth.

The material subjected to treatment is the liquid mass obtained from destructive distillation of the lignite, it being understood that the residual coke and liberated gas are not considered as starting material, but are disposed of by procedures forming no part of the present invention. Such liquid mass is in the form of a mixed liquor, which, upon standing, will separate into two crude fractions. The supernatant fraction contains mostly water, but it also contains ammonia or ammoniacal compounds, some dissolved gas, and limited quantities of hydrocarbons, whose recovery is contemplated. The lower layer obtained by separation is essentially a tarry mass, but it also contains some water, gas, and liquid hydrocarbons whose recovery is sought.

In order to effect such recoveries, I advantageously make use of a pair of stills, one disposed above the other, and effect the initial separation in the upper tank, draining as much as possible of the tar into the lower tank. Both tanks are then subjected to heat, in order to drive off the volatiles contained therein, and the heat is so applied to the two tanks that the extent of ebullition at any instant is under control. Conjunctively, I provide for the condensation and simultaneous or independent collection of the volatiles obtained by both heatings, and, for reasons hereinafter explained, I pass the hot distillate from the lower tank in heat-exchange relation with the contents of the upper tank, prior to final condensation. Eventually the condensed materials are removed from the system, for sale or use or further treatment, as may be desired, while the residues are also disposed of in a suitable manner.

Having thus briefly outlined some of the salient features of the invention, I will now describe in greater detail a type of apparatus which may be used in accordance with its principles, reference being had to the accompanying drawing, which shows in cross-section the elements of such apparatus.

Generally speaking, the apparatus comprises a separating tank and still A, connected so as to drain into a tar pot B. Both tanks A and B are connected to a condensing system C,—pot B having an intermediate heat exchange coil D located in pot A. Both pots are heated by fire or other heat from the furnace E.

The details of construction of the apparatus may be varied, and designed in accordance with known modes of construction, and hence no attempt will be made here to emphasize any specific structural form. For practical operation, however, in the handling of charges in excess of thousand gallon lots, it will be found practical to make the stills and coils of iron, and enclose them in a suitable brick framework 10. It will be seen that this frame work is such as to provide a fire zone which may be charged through the door 11, and the hot products of combustion may then flow through flues 12 and 13 around the tar pot B, thus heating its contents. These flues are also in communication with a flue 14 and a flue 15, around the pot A, so that the pot A may also be heated by the fire. Stacks 16 and 17 are provided for the escape of the waste gases.

The distribution of heat between flues 12, 13, and 14, 15, is controlled by dampers 18 and 19, which may be regulated either manually or automatically according to known practice, in order to develop or maintain whatever temperature is necessary for the proper operation of the two stills A and B. Generally speaking, the dampers (and fire) are so adjusted as to develop different extents of boiling in the stills, but it will be understood that the heat may be so applied as to develop equal temperatures in the two units, as hereinafter more fully explained.

As hereinabove explained, the still A is located at a higher level than the still B, being supported above the ground line by columns 21. Still A is provided with a valved charging pipe 22, overflow pipe 23, and draw-off pipe 24, located, as illustrated, at successively lower levels in the still. Below the draw-off pipe 24 is a drain pipe 25, also provided with a suitable valve, for draining the residual contents of the still A into lower still B. It will be understood that, in operation, still A is charged with the mixed aqueous and tarry liquid, through pipe 22, until the liquid level is brought up to the line of overflow 23. The mixed liquor is then allowed to separate by gravity, with the result that the tarry fraction sinks to the bottom of still A, from whence it may be drained into still B. Preferably, the apparatus is so designed, with reference to the character of the liquid undergoing treatment, that the tarry fraction of the full charge in still A will settle to just below the draw-off pipe 24, so that, when the draw-off line is subsequently opened, valuable tarry mater will not be lost.

After the first separation, the still A is filled again with fresh mixed liquor, and the settling and separation continued until the still A holds nothing but the crude aqueous fraction.

Still B is provided with a drain pipe 26, also suitably valved, for the removal of final residues, such as pitch, which usually are delivered into a receptacle 27 for removal from the apparatus. A steam coil 28, supplied from a source not shown, projects through the top of still B, and is utilized in the latter stages of distillation.

Connected to the top of the still B is a gooseneck 29, which terminates in a coil D, located within the still A. The discharge end of the coil is in turn connected through a valve 32 to a condenser 33, advantageously formed from a helix of pipe, and disposed in a tank 34. The coil 33 is provided with upper and lower taps 35 and 36 respectively, so that, as occasion requires, a portion of the coil can be cut out of service. Water or other cooling medium is supplied to the tank 34 through an inlet 37, and is removed through a discharge connection 38. It will thus be understood that the distillate from the still B passes through the still A, there to give up a portion of its sensible heat and aid in boiling the aqueous liquor, and thereafter is condensed in the coil 33.

The still A is also provided with a goose neck 41, which discharges into a condensing coil 42 disposed in a water tank 43, which is mounted above the tank 34. The tank 42 is provided with a cooling water inlet 44 and an outlet 45, to effect the proper condensation of distillate passing through the coil. This upper or short coil is also provided with a discharge connection 46, which is slightly different from the connections 35 and 36 for the lower or long coil 33 of the condensing system C.

This difference in the discharge connections is desired, in order to provide for the operation of the long and short condensers in parallel or separately, as the situation may require. To this end, the discharge line 46 terminates in a valve 47, which, by its position, may either deliver the effluent to a line 48 or to a U tube 49, the opposite end of which is connected to a gas separator column 51. The nature of the operations is such, however, that the discharge connections 35 and 36 do not necessarily require the equivalent of the line 48, but simply connect directly, through shut-off valves, to U tubes 52 and 53 which terminate in the separating column 51. The three U tubes 49, 52, and 53 are of such height as to maintain liquid seals of greater head than that of the gas-holder, hereinafter more particularly referred to, so that, under no circumstances, can separated gas blow back through the condensing coils and interfere with the proper operating conditions.

It will, of course, be understood from what has previously been said that, at the institution of the distilling operations, a variable quantity of non-condensible gas is driven off of the liquid in both stills A and B. Such gas is combustible, and, incidentally, toxic, and from both the viewpoints of economics and safety its separation and recovery are therefore indicated. The separating column 51 is provided to effect the separation of the gas from whatever liquid is distilled over.

The column 51 is simply made from a length of pipe of suitable diameter, capped at each end, but provided at the top with a take-off pipe 55 which leads to the gas holder (not shown), and which, according to usual practice, is maintained under a head of from four to six inches of water. Having this pressure in mind, it will be understood that the U tubes, previously referred to, should be of sufficiently greater length to prevent the gas from forcing the liquid entrapped therein back into the condensing coils. The taps for the U tubes 52 and 53 are shielded by means of baffle plates 56 and 57, welded into the tube 51. Disposed below the level of the lower U tube 53 is a discharge pipe 58, which is shielded and sealed by a baffle 59. The pipe 58 discharges into a receptacle 61, which, when filled, may be removed and replaced.

In the treatment of lignite liquors, the method which I employ in conjunction with the foregoing apparatus is as follows. It will first be understood, as above described, that the stills A and B are filled as much as may be by charging mixed liquor into still A, separating, and recharging, until still A contains practically all aqueous liquor, while still B contains a major quantity of tar. The aqueous fraction in still A contains (according to analyses of liquors which I have treated) about one-half of one per cent of anhydrous ammonia, some benzol, and limited quantities of the various cresols. The complete distillation of the fraction is therefore not indicated for obvious economic reasons, but I have found that it is highly advantageous to subject this liquor to some distillation, as most of the values may be removed in the initial heat treatment.

The tarry liquor, on the other hand, contains but very little water or values calculated as ammonia. In fact, one of the salient features of the invention is to effect the preliminary separation by gravity, in order to have available two fractions which may be treated. It has been observed that, if the original liquor were subjected to boiling, the foaming and frothing effects would be so propounced that it would be extremely difficult, if not practically impossible in simple apparatus, to control the distillation. On the other hand, it is not desirable to send all the aqueous fraction to waste. Accordingly, after the preliminary gravity separation, as above described, the two stills A and B are subjected to furnace heat, the control being maintained by known mechanical appliances, which it is deemed unnecessary to describe here in detail.

As the liquors increase in temperature, the incondensible gases are driven off, pass through the condensing coils 33 and 42, and are collected through the take off pipe 55. In this initial stage of operation, the damper 18 is opened but slightly, so that the hot gases from the still B are cooled by the liquor in still A, thereby effecting a saving of heat, since the aqueous liquor is relatively cold, and must be brought up to temperature in any event.

As soon as the gas discharge is pronounced, the dampers 18 and 19 are shifted, thus increasing the rate of heating on still A, so that it will not lag behind still B. More or less ammonia, and water, begin to come over as the temperature approaches 100° C., together with some benzol. The end point for this stage of the distillation may be set for say 100° C., the exact value varying, of course, with such factors as the barometric pressure. In any event, following the discharge of the gas, the principal values are concentrated ammonia and benzol, which are simultaneously distilled from tanks A and B, condensed in the condenser C, and subsequently collected at the bottom of the column 51, in one of the collecting tanks 61. This mixture may then be separated in any desired fashion, which is not a feature of the present invention.

At this stage of the operation, the valve 47 is set to pass the effluent from the short condenser 42 through its connected U tube 49, and the valves in the lines 35 and 36 are also opened for connection to the column 51. Thereafter, the valve 47 is closed so as to by-pass further effluent from the short condenser 42 into the separate discharge line 48, which is now permissible, since practically all the non-condensible gases have been removed. The damper 18 is also closed to such extent as may be permissible, while the damper 19 is opened, and further distillation in the still A is effected by utilizing the heat of the distillate from the still B, which, beyond this point, is at a materially higher temperature than the boiling point of the remaining aqueous liquor.

At temperatures above 100° C., the still B is operated as an ordinary recovery still, the distillate at the successively higher temperatures first giving up some heat to the liquor in still A, to continue distillation therefrom, and then being condensed through the coil 33, collected in the column 51, and removed through the receiving containers 61. The toluols are removed from between 108° and 112° C. at standard pressure, and are followed by the xylols and naphthas at increasing temperatures up to about 218° C.

When the temperature goes above 260° C., which is the distillation point for the anthracene, it is desirable to aid the operation by injecting live steam through the pipe 28, and at this time the condenser 33 may be shortened by closing the valve in line 36, taking off the condensate through line 35. As the distillation reaches its end point, there remains in the pot B a mass of pitch, which may be drained through the pipe 26 into the receptacle 27.

It will be understood that the heat of the distillate is utilized to continue the boiling of the aqueous liquor contained in still A, and so much of the distillate from such liquor as may be profitably utilized is removed from the system through the drain 48, while the liquid in tar pot B is being distilled as above described. Any remaining liquor in still A may then be sent to waste, through the drain 24, and the recovery of the values in the aqueous fraction is thus obtained with a minimum expenditure of heat, while at the same time protecting the tarry fraction from detrimental foaming.

By the foregoing invention, there is thus provided an effective apparatus and method for extracting from the lignite liquors the valuable constituents therein, in the form of more or less refined products which may be utilized to advantage. It will, of course, be understood that I do not claim broadly the simple distillation or fractionation of such liquor, but I do intend to claim broadly the novel features above set forth, as recited in the following claim.

I claim:

The method of recovering valuable constituents from lignite liquors, which comprises the steps of effecting a separation of such liquor into an aqueous and a tarry fraction, simultaneously subjecting both of said fractions to a temperature high enough to drive out gases therefrom but too low to effect the distillation therefrom of ingredients of appreciably higher boiling point, passing the distillate from the tarry fraction in heat exchange relationship with the aqueous fraction to minimize the heat energy required for such treatment, condensing the distillates and collecting them in a common receiver, effecting the separation of incondensible gas and liquid in such receiver, thereafter increasing the temperature of the tarry fraction and passing the distillate resulting therefrom in heat exchange relationship with the aqueous fraction, simultaneously diverting the distillate from the aqueous fraction from said receiver, thereby separating said distillates from the said fractions, and utilizing the heat of the distillate from the tarry fraction as the principal means for effecting distillation from the aqueous fraction.

RAYMOND NAUTH.